Jan. 21, 1958 R. S. RANKIN 2,820,758
TREATMENT OF SEWAGE IN LIQUID FORM AND SIMILAR MATERIALS
Filed Oct. 15, 1952 6 Sheets-Sheet 1

INVENTOR
RENVILLE S. RANKIN,
BY
john E. Hubbell
ATTORNEY

Jan. 21, 1958 R. S. RANKIN 2,820,758
TREATMENT OF SEWAGE IN LIQUID FORM AND SIMILAR MATERIALS
Filed Oct. 15, 1952 6 Sheets-Sheet 5

INVENTOR
RENVILLE S. RANKIN,
BY
John E. Hubbell
ATTORNEY

| ANNULAR SECTION | SECTION-RADII | | SECTION AREA | TOTAL | | TROUGH-FLOW CU.FT./SEC. |
|---|---|---|---|---|---|---|
| | OUTER | INNER | | GAL./DAY | CU.FT./SEC. | |
| I | 40'-0" | 32'-6" | 1710 | 891.000 | 1.38 | 0.69 |
| II | 32'-6" | 25'-3" | 1315 | 684.000 | 1.06 | 1.22 |
| III | 25'-3" | 16'-9" | 1120 | 583.000 | 0.91 | 1.675 |
| IV | 16'-9" | 8'-0" | 680 | 355.000 | 0.55 | 1.950 |
| | | | | TOTAL 2,513,000 | 3.90 | |
| $C_1$ | $C_2$ | $C_3$ | $C_4$ | $C_5$ | $C_6$ | $C_7$ |

INVENTOR
RENVILLE S. RANKIN,
BY
John E. Hubbell
ATTORNEY

United States Patent Office 2,820,758
Patented Jan. 21, 1958

2,820,758

TREATMENT OF SEWAGE IN LIQUID FORM AND SIMILAR MATERIALS

Renville S. Rankin, Stamford, Conn., assignor to Dorr-Oliver Incorporated, a corporation of Delaware Application October 15, 1952, Serial No. 314,790

6 Claims. (Cl. 210—4)

My present invention relates to the treatment of sewage in liquid form and similar materials.

In the treatment of sewage and similar liquids the primary object is to remove their polluting elements which, if allowed to remain, will degrade the stream into which the liquids are discharged by robbing the stream of its essential oxygen. Treatment of these polluting liquids is usually accomplished by biologic oxidation processes in which aerobic bacteria function to oxidize the polluting elements and convert them into stable non-putrescible compounds. In the activated sludge process of biologic oxidation, for example, the oxidizing bacteria form nuclei which in turn appear as visible solids in suspension. These solids in suspension after circulating through the oxidation phase of treatment pass into a sedimentation tank where they are removed from the oxidized liquid and returned for re-use to the oxidation process. When these nuclei containing solids leave the oxidation step, the free oxygen so necessary to their life and function is no longer as plentiful and, as a consequence, they tend to draw on the available dissolved oxygen in the settling tank liquor. To minimize this depletion of oxygen and to maintain life and vigor to the oxidizing bacteria, it is essential to return the nuclei containing suspended solids to aeration section as quickly as possible.

The apparatus and methods heretofore used to rapidly return the suspended solids to the aeration section have proved defective in that they either take so much time that there is a marked deterioration in the quality of tank effluent or viability of the bacteria; or they endeavor to speed up the time of removal of the suspended solids without providing for the uniform removal of all of the nuclei carrying solids; or they include no provision for the removal of inert and gritty material separately from the desirable solids.

My present invention overcomes these defects and provides a positive and controlled means of rapidly withdrawing the desirable nuclei-carrying suspended solids and at the same time providing a means of separately removing the material consisting of inert solids and gritty materials which settle to the floor of the tank.

The primary purpose of the sedimentation tank is to separate the entrained solids in the feed from the liquid so as to produce a clarified effluent but, at the same time to separate and return as rapidly as possible the active solids as previously described. The active solids are not necessarily distributed uniformly over the entire settling area and some sections may have greater concentrations of settling solids than other areas. Heretofore, no attempts have been made to withdraw solids at different rates over the settling area in proportion to the concentrations of solids in those areas because no facilities were available to accomplish this function. My invention makes it possible to withdraw solids at varying rates at a number of radial points on the rotating mechanism, thus providing selective solids withdrawal from various areas.

The adequacy of the facilities embodied in my invention for withdrawing the required volumes of solids for return to the aeration section can be readily illustrated, by comparing the performance of the typical activated sludge plant heretofore used with the performance of a plant of similar capacity which is constructed and operated in accordance with my invention. In the typical activated sludge plant heretofore used, the volume of "return" is on the order of twenty-five percent of the average flow undergoing treatment. Also, in said typical plant, the sedimentation tank following the aeration section is nominally rated at 1,000 gallons of effluent per square foot of gross tank area.

In the use of the present invention, the volume of "return" is usually larger than twenty-five percent. In the practice of my invention, the returned solids will normally be more dilute or less concentrated than in said typical prior plant, and the "return" may well be fifty percent by volume of the tank effluent. To be on the conservative side, particularly because the returned solids conceivably will be more dilute or less concentrated with the practice of my invention, we can assume the "return" to be fifty percent by volume of the tank effluent.

In the preferred mode of practicing the present invention, I make use of a sedimentation tank or clarifier of well known form which includes a rake structure slowly rotated about the tank axis, and blades or sweeps for working heavy solids collecting on the floor of the settling tank toward, and eventually into, a sludge discharge outlet. In accordance with the present invention, I combine the above mentioned sedimentation tank or clarifier and its rake structure with apparatus operative to withdraw relatively active suspended activated solids from the tank while working heavier and inert solids along the floor of the settling tank or clarifier to a separate sludge outlet.

In the preferred form of the invention, the draw-off apparatus includes a plurality of uprising draw-off pipes supported and rotated about the center column by the rake structure, and having their inlet ends adjacent the tank floor and at different distances from the center column. Preferably, each draw-off pipe is subject to a control adjustment regulating the amount of suspended solids and entraining liquid withdrawn through said pipe. Said draw-off pipes are arranged to have their upper ends discharge into a radial collecting trough connected to the revolving rake structure. Each such collecting trough discharges into a conduit apparatus for returning the activated solids collected to the aeration section of the apparatus.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1a is a schematic diagram of an activated sludge treatment apparatus including the clarifier shown in Fig. 1;

Figure 1:
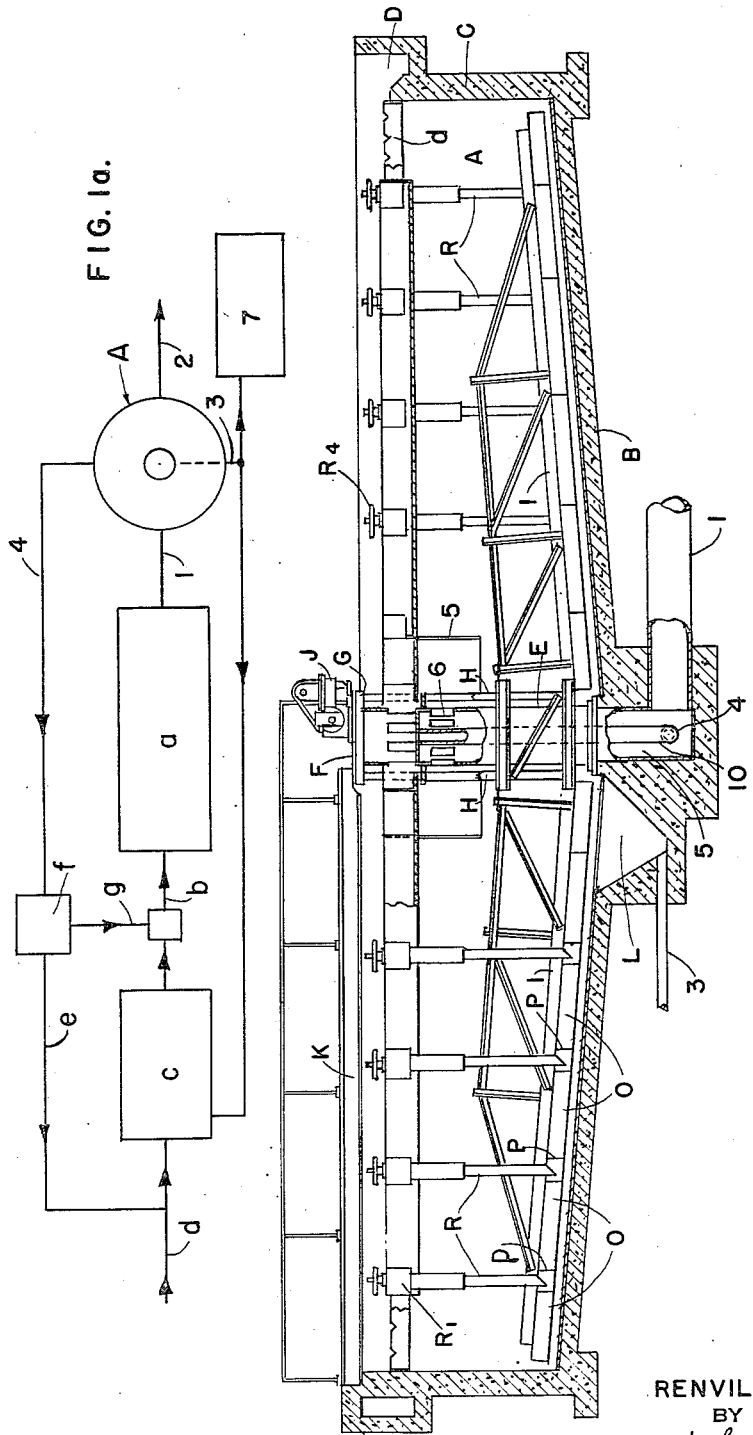
Fig. 1 is a sectional elevation of a clarifier.

In Fig. 1a I have schematically illustrated an activated sludge treatment system for use in the practice of the present invention. The apparatus shown in Fig. 1 includes a final sedimentation tank or clarifier A, with an inlet receiving activated sewage through a pipe 1 from an aeration section or unit $a$, an overflow outlet 2 for clarified liquid effluent, an outlet 3 for heavy and inert sludge, and an outlet 4 for suspended solids and entraining liquid to be returned to the aeration section $a$. As shown diagrammatically in Fig. 1a, the aeration section $a$ receives pretreated sewage through a conduit $b$ from a pretreatment section $c$ which may be a preliminary sedimentation device receiving sewage through a supply conduit $d$. Settled solids to be returned to the section $a$ from the clarifier A, are passed to a splitter box $f$ from the clarifier A through its outlet 4. A portion of solids passed through the splitter box $f$, pass from the latter into a conduit $g$ and thence into the conduit $b$ for return to the aeration section $a$. Another portion of the solids are usually wasted, passing from splitter box $f$ through a conduit $e$, into the conduit $d$ and then to the primary tank $c$ or elsewhere.

As shown, the final sedimentation tank or clarifier A has a conical concrete bottom wall B, a vertical concrete peripheral wall C with a launder D at its upper end, and a hollow center column structure E. The latter may be formed of concrete or metal, and supports a non-rotatable operation table F at its upper end. A turntable G supports a subjacent rake structure H which includes a pair of rake arms I extending radially away from the center column E, at opposite sides of said column. A motor drive mechanism J mounted on the operation table F, is arranged to rotate the turntable G and rake structure H in the clockwise direction about the tank axis. A conventional walkway K has one end resting on the peripheral wall C and has its other end resting on the operation table F.

Figure 2:
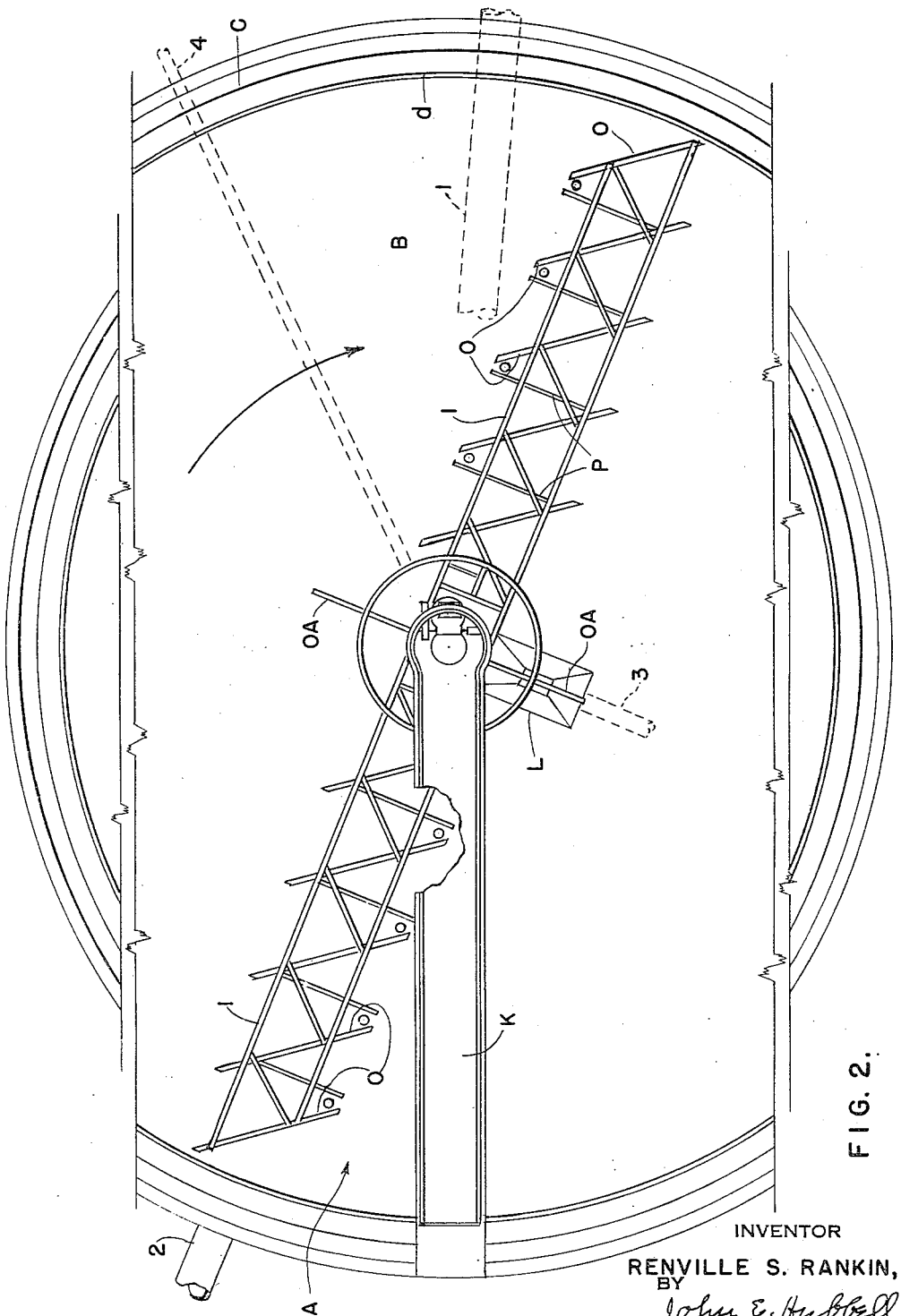
Fig. 2 is a plan view of the clarifier shown in Fig. 1 with parts broken away.

The sewage treated in the tank A is supplied to the latter through the influent pipe 1, which discharges into the lower end of the chamber space 5 in the hollow center column E. The sewage passes away from the chamber 5 through outlet ports 6 in the center column wall, which opens into the tank at a level somewhat below the level at which liquid overflows the weir plate $d$ which forms the upper portion of the inside wall of the launder D. As indicated by the arrow in Fig. 2, the rake structure shown rotates in the clockwise direction, but the apparatus may equally well be designed for counter-clockwise rotation.

Figure 7:
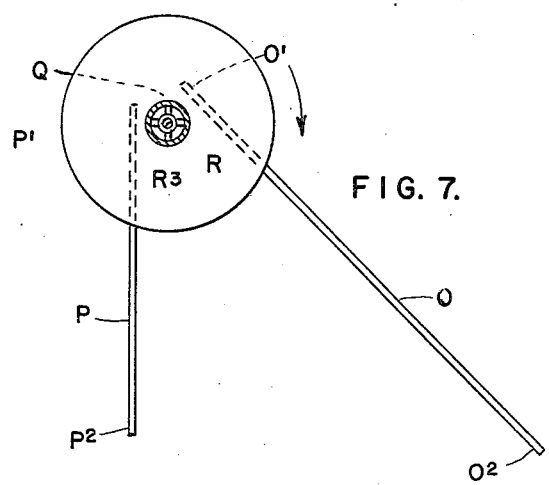
Fig. 7 is a plan section on the line 7—7 of Fig. 6.
Figure 6:
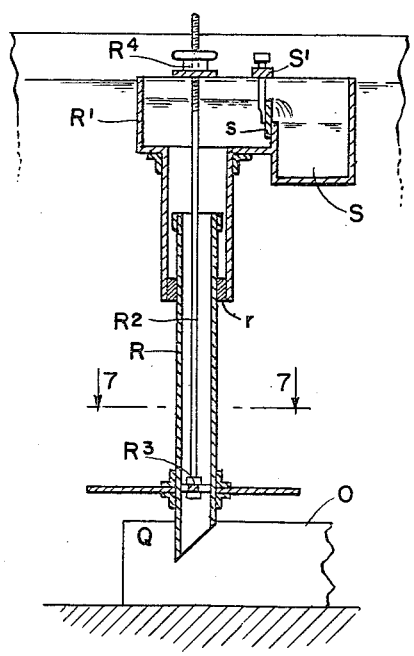
Fig. 6 is an enlarged scale elevation in section on the line 6—6 of Fig. 5.

Each rake arm I supports a separate series or set of vertical bottom scraping blades O. The blades of each set are located at progressively increasing distances from the axis of the center column. As shown, the blades are all substantially parallel to one another and are inclined to their respective annular paths of movement about the tank axis. The blades O are of such length and so disposed that as shown in Fig. 7, the trailing end O' of each outer blade is nearer the axis of the tank than is the leading end $O^2$ of the adjacent blade O at its inner side. Thus the trailing ends of different outer blades of each set move over annular portions of the tank bottom wall at progressively greater distances from the tank axis. Further, the trailing end O' of each outer blade O moves over an annular portion of the tank bottom wall or floor nearer to the tank axis than is the leading end $O^2$ of the adjacent blade at the inner side of the first mentioned blade.

The lower edges of the rake blades are in close proximity to the tank floor B, and with the direction of rake rotation and blade inclination described, each outer blade moves solids settling on the annular portion of the bottom wall surface portion over which the blade moves, into the annular path of the adjacent blade nearer to the center of the tank. In consequence, the scraper blades O connected to the rake arms I and the scraper blades OA connected to the rake structure and extending radially away from the center column cooperate to move solid deposits on the tank bottom wall into a sludge receiving pocket or recess L in the tank bottom wall, adjacent the center column E. The sludge collecting in the pocket or recess L is withdrawn from the latter through a pipe 3 which may pass more or less of the heavy sludge from said recess to the preliminary treatment tank and the remainder to some other suitable receiver or sump.

Insofar as above described, the apparatus shown is typical of the settling tank or clarifier prior art, and includes nothing claimed as novel herein.

For the purposes of the present invention, I provide each rake arm with a set of vertical plates P, one adjacent to and at the inner side of each of the blades O which is too far away from the tank axis to move over the sludge pocket or recess L. Each plate P is inclined to the adjacent blade O at the trailing side of said plate so that the blade O and plate P are separated from one another by a tapered space Q. The trailing ends O' and P' of the blade O and deflector plate P at opposite sides of each tapered space Q are separated by a distance of 6 to 9 inches, while the leading ends $O^2$ and $P^2$ of said blade O and deflector plate P at opposite sides of each space Q may be separated by a distance of from 6 to 10 feet. The width of the leading end of each space Q may well decrease as the distance of said space from the axis of the tank increases, and the linear velocity of the side walls of said space Q' increases.

The blade O and deflector plate P at opposite sides of each tapered space Q may be regarded as forming the side walls of a solids deflector having its bottom formed by a corresponding annular section of the tank floor, and open at its upper side. While not essential, each deflector plate P may well be at an angle of 90°, to the radial direction of the supporting rake arm I, while each blade O may well diverge from the associated plate P at an angle of the order of 45°. Each of the blades O and plates P may have a vertical extent of a foot or so. The operative effect of the scoop or shovel formed by the blade O and plate P at opposite sides of a space Q is somewhat analogous to the action of a plow, in that it tends to laterally deflect all of the solids in the corresponding space into a row of a width depending on the width of the trailing end of the space Q.

In accordance with present invention, the relatively active suspended solids are withdrawn from the narrow or trailing end of each space Q by a corresponding uprising draw-off pipe R connected to and rotated by the rake structure H. As shown, each draw-off pipe R has its lower end bevelled with its cut-away side facing away from the narrow end of the corresponding space. Ordinarily the bottom of the cut-away end of the draw-off pipe is separated from the adjacent portion of the tank bottom wall by a distance which may be as small as 6" and may be as great as two feet. As shown, each draw-off pipe R comprises upper and lower sections connected by a telescopic joint $r$. The upper section of each draw-off pipe R depends from a box-like chamber $R^1$ above the corresponding draw-off pipe. The chamber $R^1$ receives liquid entraining suspended solids through an opening in the bottom wall of said box.

Each receiving chamber $R^1$ is alongside and is mechanically connected to a radial trough S. There are two troughs S, one at each side of the center column E. The two troughs S have their adjacent ends connected to one another and to the rake structure H, as is hereinafter explained. The lower and upper sections of each draw-off pipe R are connected for axial adjustment of the lower section by a rod R² centrally disposed in the draw-off pipe and connected to the lower section of the pipe by a spider R³ shown in Fig. 7. The upper end of the rod R² is threaded and extends through a nut R⁴ supported by the top portion of the chamber R¹. The chamber R¹ is in free communication with the adjacent trough S above the level of a vertically adjustable weir s. The latter forms the upper portion of a dam which may be adjusted by a nut and screw connection s' between the weir plate and the top wall portion of the chamber R¹.

Figure 3:
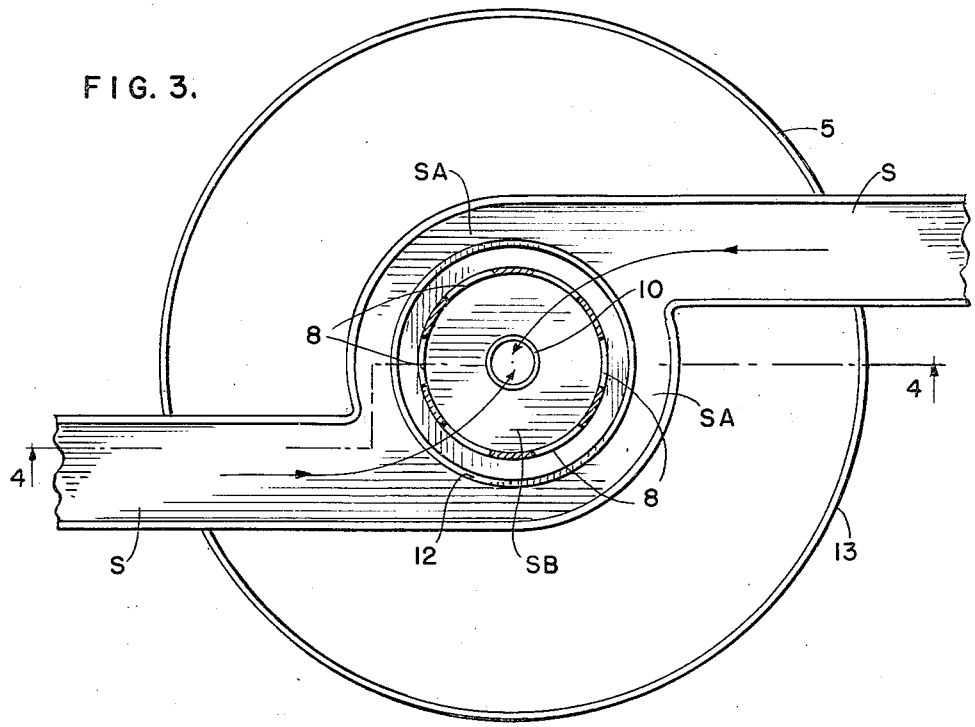
Fig. 3 is a plan section on an enlarged scale of a portion of the apparatus shown in Fig. 1, the section being taken on the broken line 3—3 of Fig. 4.
Figure 4:
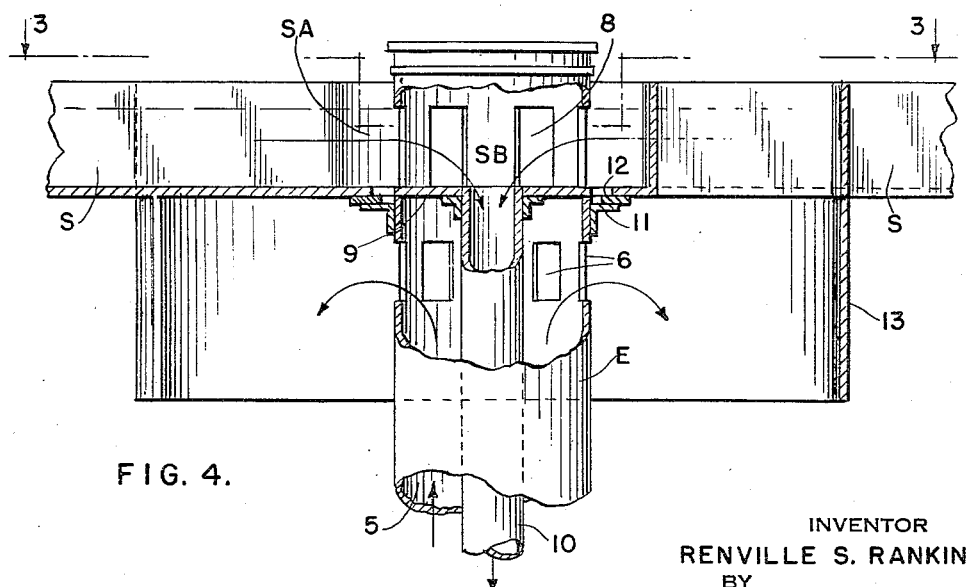
Fig. 4 is a vertical section taken on the line 4—4 of Fig. 3.
Figure 5:
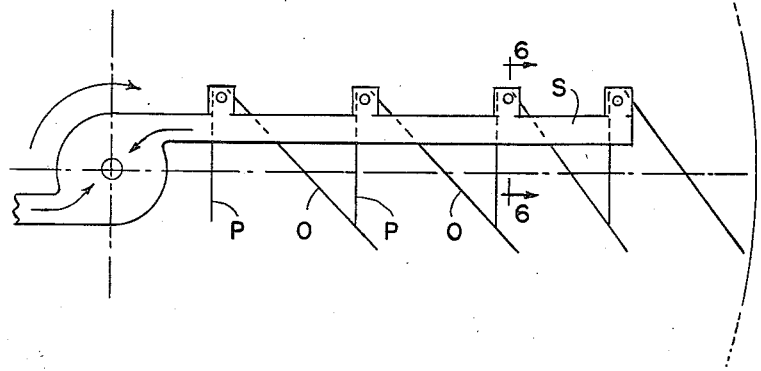
Fig. 5 is a diagrammatic plan view of apparatus shown in part in Fig. 3.

The adjacent ends of the two troughs S are connected to one another and the center column integrally connected by trough bottom wall and side extensions, as is shown best in Figs. 3 and 4. The two troughs S are parallel to, but are displaced to opposite sides of a vertical plane which intersects the center column axis. The wall parts connecting the two troughs S provide an annular chamber SA, surrounding the upper end of the center column E and in communication with a chamber SB within the column E through ports 8 formed in the column wall. A horizontal partition 9 within the column E forms a top wall for the subjacent space 5 and a bottom wall for the chamber SB. The partition 9 is formed with a central opening through which liquid and entrained solids pass from the chamber SB into the upper end of a pipe 10 which is centrally disposed in the space 5 and has its lower end connected through the pipe 4 to the aeration section a of the apparatus.

The annular bottom wall of the channel SA which is rigidly connected to the troughs S, is supported by a subjacent annular flange member 11 surrounding and attached to the center column E. A washer member 12 is interposed between the flange 11 and the portion of the trough structure above the flange. The member 12 and the parts between which it is interposed, provide an effective seal between the troughs S, the channel SA, and the outer wall of the center column E, so that in normal operation there will be no significant flow of fluids or solids through the points between the trough structure and the center column. The troughs S are further connected to one another and have their connection given increased rigidity by a vertical cylinder 13. The latter is coaxial with and substantially larger in diameter than the center column E and may be welded to each of the troughs S. In addition to reinforcing and stiffening the central portion of the trough structure, the cylinder 13 serves as a vertical apron or baffle which downwardly deflects the influent passing into the main tank or chamber A from the ports 6.

Advantageously there is a central driving connection between the trough structure and the rake structure H. That connection can take various forms. As shown, it comprises arms I attached to and extending radially away from the upper portion of the rake structure H surrounding the center column. The arms I may be attached to the trough structure bottom wall at various points nearer to the cylinder 13 than to the center column E. The uprising draw-off pipes may be connected to the rake arms I, so to provide driving connections between the slowly rotating troughs S and rake structure H.

Each trough S has a length slightly less than half the diameter of the tank A which may well be 80 feet or more. Thus the trough structure ordinarily holds a good many gallons of effluent. However, the weight of the trough structure and depending draw-off conduits R may be substantially balanced in normal operation by the floatative force of the liquid in which the troughs S and channel SA are partially submerged. Thus, as shown in Figs. 1 and 4, the liquid level in the trough S is appreciably below the liquid level in the tank.

It is believed that the general operation of the apparatus shown in Figs. 1 to 8 will be readily apparent to those skilled in the art, from the drawings and foregoing explanations, and may be summarized as follows:

The rake structure H is normally rotated slowly but continuously by the drive mechanism J. As the rake structure revolves, each scraper blade O and associated deflector plate P cooperate to work the solids deposited on the annular section of the tank floor over which the corresponding face Q is moved into an annular row narrower than said annular section. Each blade O and associated plate P also work the suspended solids in the space Q between said blade and into the narrow trailing discharge end portion of the space, and hence into position to be sucked upward by the corresponding draw-off pipe R. By suitably regulating the weir s hydrostatic pressure will force the suspended solids to move through the draw-off pipes into the troughs S without a corresponding up movement of a significant amount of the solids settled on the tank floor which include practically no activated material and which are desirably worked into the solids receiving pocket or recess L in the tank bottom wall. Such regulation is effected by suitable vertical adjustment of the elevation of the lower end of each draw-off pipe from the adjacent bottom wall of the tank, and adjustment of the difference between the liquid level in the troughs S and the liquid overflow level from the tank into the launder D.

The rate at which liquid and entrained solids are moved up into the corresponding trough S by each draw-off pipe R, is dependent on the vertical adjustment of the weir plate s in each chamber R which overflows into the associated trough S, and on the vertical adjustment of the circular weir plate d which fixes the overflow level of the clarifier tank.

Figure 8:
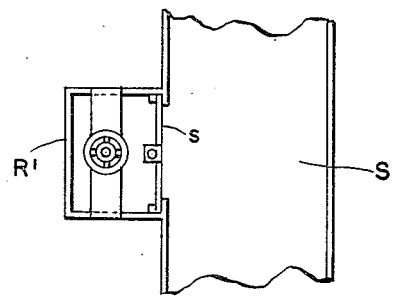
Fig. 8 is a reproduction on an enlarged scale of a portion of the apparatus shown in Fig. 5.
Figure 9:
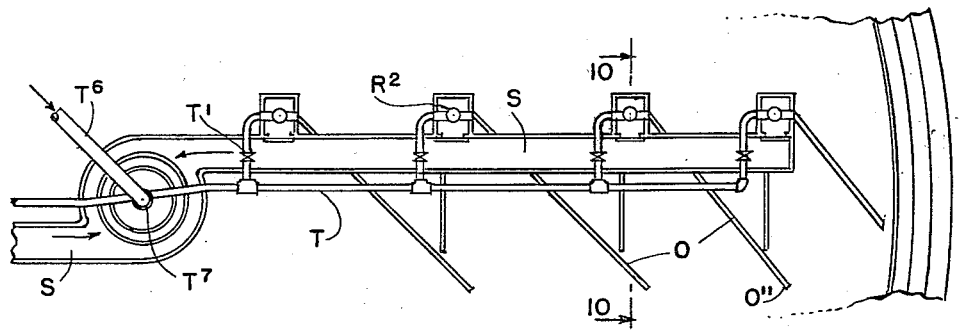
Fig. 9 is a plan view of a modified form of the apparatus shown in Fig. 5.
Figure 10:
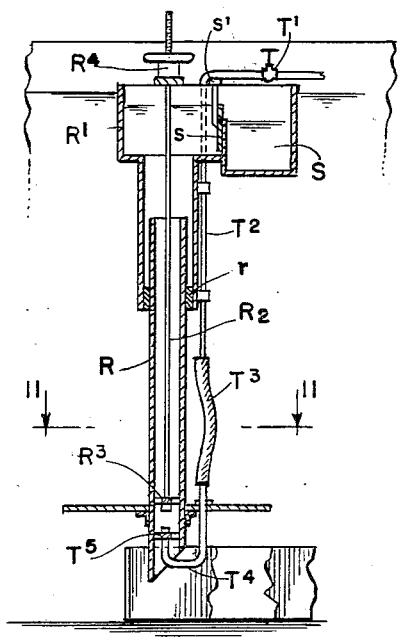
Fig. 10 is a section on the line 10—10 of Fig. 9.
Figure 11:
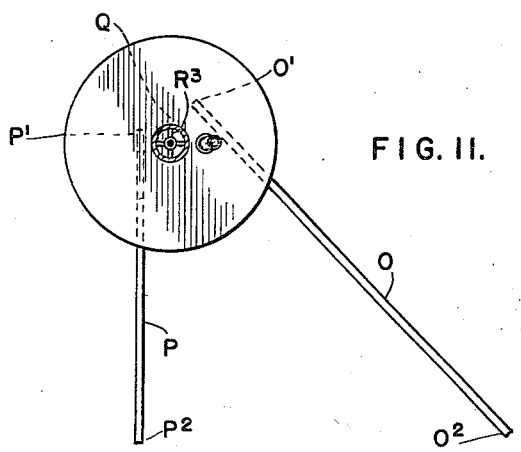
Fig. 11 is a section on the line 11—11 of Fig. 10.

As will be apparent, the apparatus illustrated in Figs. 1 and 8 may take various forms. In particular, the pressure differential between the liquid entering the lower end of each draw-off pipe and the pressure of the liquid and entrained solids entering the corresponding overflow chamber R¹, may be varied by the airlift action with or without vertical adjustment of the lower end of the draw-off pipe. Thus, as is shown in Figs. 9, 10 and 11, air supplied under pressure through a pipe T alongside the troughs S may be passed from that pipe into the lower end of each draw-off pipe R through a piping branch including a valve T', a depending pipe section T², a flexible hose section T³, and a U-shaped pipe section T⁴. As shown, the U-shaped pipe section T⁴ has one uprising end or leg extending into the lower end of the pipe section T³, and has its other uprising end or leg extending into the corresponding draw-off pipe R. Advantageously, the last mentioned leg is surrounded by a centering spider T⁵ within the pipe R.

Air under pressure may be supplied to the pipe T through a pipe T⁶ having one end connected to an unillustrated source of air pressure, and having its other end connected by a swivel joint T⁷ to an uprising branch T⁸ of the pipe T which is coaxial with the rake structure. With the arrangement shown in Figs. 9 to 11, the differential between the pressure in the submerged lower end of each draw-off pipe R and the pressure in the corresponding chamber R' may be regulated by the corresponding valve T'.

Figure 12:
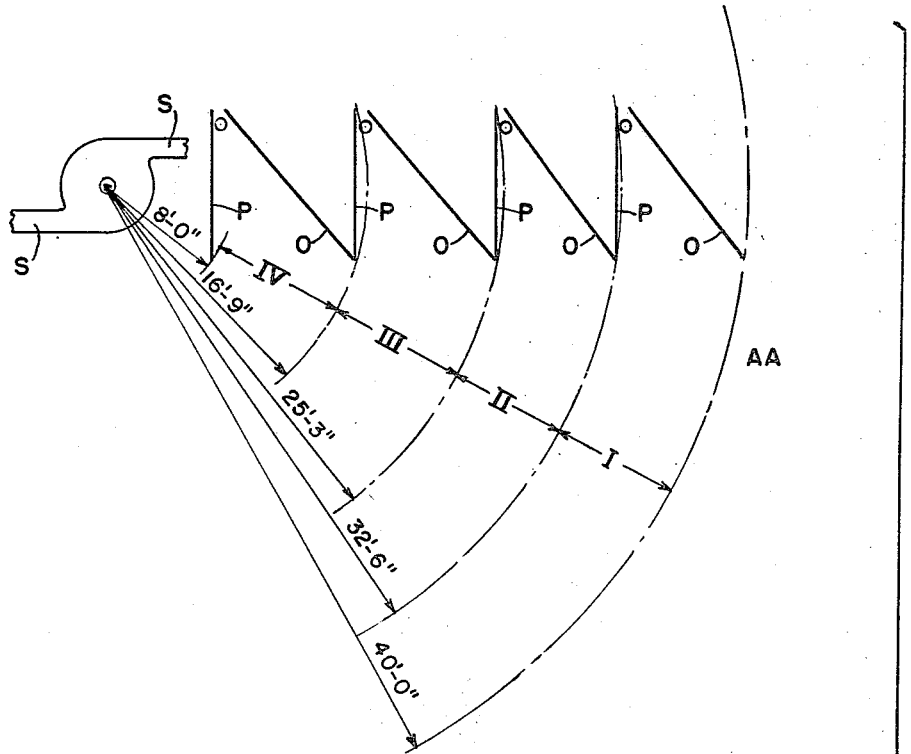
Fig. 12 is a diagram showing an arrangement of draw-off pipes and the magnitude of sludge quantities which may be handled under particular conditions in the practical use of the invention.

In Fig. 12 I have diagrammatically illustrated the normal contemplated performance of an eighty foot diameter, sewage sedimentation tank AA of the type shown in Figs. 1–11. As diagrammatically illustrated, the tank settling space comprises four annular sections I, II, III and IV, having the radial dimensions indicated in Fig. 12. The outer and inner edges of each of said sections are defined by the respective leading end of the corresponding deflector plate P and by the leading end of the correspondnig scraping blade O.

The Fig. 12 diagram comprises seven side-by-side data columns, C1, C2, C3, C4, C5, C6 and C7. The section numbers I, II, III and IV appear in column C1. Columns C2 and C3 show the lengths of the outer and inner radii, respectively, of each of the four sections. Column C4 shows the areas in square feet of each of the four sections. Column C5 shows the assumed volumes of returned solids withdrawn from each of the different sections in gallons per day, and the total of those volumes. Column C6 shows the volumes of returned solids withdrawn from each of the different sections in cubic feet per second, and the total of said volumes. Column C7 shows the volumes of returned solids withdrawn from the different sections by one of the two radial troughs S from each of the annular sections in cubic feet per second.

The total volume of return of 2,513,000 gallons per day, from an eighty foot diameter sewage treatment tank having two associated rotating troughs S each with four draw-off pipes R respectively associated with the four annular sections I, II, III and IV, as indicated in Fig. 12, is believed to be an average normal performance for such a tank.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In the treatment of liquids having polluting material therein wherein said liquid and polluting material are passed through a preliminary treatment station and are then circulated to a sedimentation tank through an inlet therein, the improved process comprising the steps of selectively withdrawing suspended solids in the sedimentation tank from a plurality of zones spaced at different distances from said tank inlet, and returning at least a portion of said withdrawn suspended solids to said preliminary treatment station.

2. In the treatment of liquids having polluting material therein wherein said liquid and polluting material are passed through a preliminary treatment station and are then circulated to a sedimentation tank through an inlet therein, the improved process comprising the steps of withdrawing clarified effluent from said tank in a zone spaced from said inlet, separately withdrawing settled solids from said tank, separately and selectively withdrawing suspended solids from a plurality of separate zones disposed between said inlet and the zone from which said clarified effluent is removed, and returning at least a portion of said withdrawn suspended solids to said preliminary treatment station.

3. In the treatment of liquids having biological flocculent material suspended therein, in which treatment the liquid and suspended biological flocculent material are passed through a biological oxidation section into a sedimentation tank through an inlet in the latter, the improved process comprising the steps of selectively withdrawing suspended biological flocculent material from a plurality of zones in said sedimentation tank spaced at different distances from said tank inlet, and returning at least a portion of said withdrawn biological flocculent material to said biological oxidation section.

4. In the treatment of liquids having biological flocculent material suspended therein, in which treatment said liquid and suspended biological flocculent material are passed through a preliminary treatment station and are then passed into a sedimentation tank through an inlet therein, the improved process comprising the steps of separating the suspended biological flocculent material in the sedimentation tank into a plurality of zones varying in degree of biological activity, selectively withdrawing said suspended biological flocculent material from a selected tank zone, and returning at least a portion of said withdrawn suspended material to said preliminary treatment station.

5. In the treatment of liquids polluted with settleable solids and suspended biological flocculent material, in which treatment the liquid and polluting materials are passed through a biological oxidation section into a sedimentation tank through an inlet in the latter, the improved process comprising the steps of withdrawing clarified effluent from said tank, separately withdrawing settled solids from said tank, separately and selectively withdrawing suspended biological flocculent material from a plurality of zones in said sedimentation tank at different distances from said tank inlet, and returning at least a portion of said withdrawn biological flocculent material to said biological oxidation section.

6. The method as defined in claim 5, wherein said plurality of zones are substantially concentric annular volumes surrounding said inlet.

References Cited in the file of this patent

UNITED STATES PATENTS

| | | |
|---|---|---|
| 2,167,443 | Bevan | July 25, 1939 |
| 2,418,950 | Montgomery | Apr. 15, 1947 |
| 2,419,492 | Green | Apr. 22, 1947 |
| 2,436,584 | Logan | Feb. 24, 1948 |
| 2,568,452 | Kelly et al. | Sept. 18, 1951 |
| 2,677,657 | Jenks | May 4, 1954 |
| 2,714,090 | Thompson | July 26, 1955 |